(12) United States Patent
Miyamoto et al.

(10) Patent No.: US 6,752,374 B2
(45) Date of Patent: Jun. 22, 2004

(54) ELECTROMAGNETIC VALVE AND METHOD OF MANUFACTURING SAME

(75) Inventors: Yutaka Miyamoto, Nukata-gun (JP); Shigeiku Enomoto, Hoi-gun (JP); Hirokuni Tomita, Okazaki (JP); Yukihiro Shinohara, Kariya (JP)

(73) Assignees: Nippon Soken, Inc., Nishi (JP); Denso Corporation, Kariya (JP)

( * ) Notice: Subject to any disclaimer, the term of this patent is extended or adjusted under 35 U.S.C. 154(b) by 178 days.

(21) Appl. No.: 10/197,889

(22) Filed: Jul. 19, 2002

(65) Prior Publication Data

US 2003/0020038 A1 Jan. 30, 2003

(30) Foreign Application Priority Data

Jul. 25, 2001 (JP) ........................................ 2001-224673
Feb. 28, 2002 (JP) ........................................ 2002-052828

(51) Int. Cl.[7] .............................................. F16K 31/02
(52) U.S. Cl. .............................. 251/129.15; 251/129.01
(58) Field of Search ......................... 251/129.01–129.22

(56) References Cited

U.S. PATENT DOCUMENTS

| | | | | |
|---|---|---|---|---|
| 4,640,391 A | * | 2/1987 | Maehara et al. ............ | 188/353 |
| 4,821,774 A | * | 4/1989 | Chorkey ................ | 137/625.65 |
| 5,467,962 A | * | 11/1995 | Bircann et al. ......... | 251/129.15 |
| 5,709,370 A | * | 1/1998 | Kah, Jr. .................. | 251/129.15 |
| 5,845,672 A | * | 12/1998 | Reuter et al. .......... | 137/315.03 |
| 6,202,936 B1 | * | 3/2001 | Frick ............................. | 239/5 |
| 6,311,674 B1 | | 11/2001 | Igashira et al. | |
| 6,598,852 B2 | * | 7/2003 | Tomoda et al. ......... | 251/129.19 |
| 6,669,166 B2 | * | 12/2003 | Enomoto et al. ...... | 251/129.15 |

OTHER PUBLICATIONS

U.S. application Ser. No. 09/903,773, Enomoto et al, filed Jul. 13, 2001.

* cited by examiner

Primary Examiner—Paul J. Hirsch
(74) Attorney, Agent, or Firm—Nixon & Vanderhye P.C.

(57) ABSTRACT

In an electromagnetic valve, after a solenoid assembly, in which a housing surrounds an outer circumference of a solenoid composed of a coil and a bobbin and a resin connector is formed on the housing by injection molding, and a valve body assembly, in which a valve body member is slidably housed to move reciprocatingly in a valve case cylindrical hollow of a valve case member, are independently sub assembled, the valve body assembly is integrated with the solenoid assembly in such a manner that the valve case member is axially inserted into a cylindrical hollow of the bobbin and, then, an axial end of the housing is fixed to an outer circumference of the valve case member by crimping. Accordingly, if a malfunction of a component part occurs during manufacturing processes, less number of component parts are rejected as failure.

13 Claims, 9 Drawing Sheets

US 6,752,374 B2

ELECTROMAGNETIC VALVE AND METHOD OF MANUFACTURING SAME

CROSS REFERENCE TO RELATED APPLICATION

This application is based upon and claims the benefit of priority of Japanese Patent Applications No. 2001-224673 filed on Jul. 25, 2001 and No. 2002-52828 filed on Feb. 28, 2002, the contents of which are incorporated herein by reference.

BACKGROUND OF THE INVENTION

1. Field of the Invention

The present invention relates to an electromagnetic valve for controlling fluid flow, typically, applicable to a variable discharge high pressure pump for a diesel engine for controlling fuel amount thereof.

2. Description of the Prior Art

JP-A-11-336638 discloses an electromagnetic valve applied to a variable discharge high pressure pump for a diesel engine.

The electromagnetic valve has, as main components, a valve case, a valve body slidably housed in the valve case, a solenoid including a coil and a stator for attracting the valve body on energizing the coil. According to the electromagnetic valve, a displacement position (lift amount) of the valve body is governed by an amount of current applied to the coil so that an opening area of a fluid passage, through which fuel flows, is defined for controlling fuel amount.

Further, the lift amount of the valve body, which defines the fuel amount, is variable according to a change of electromagnetic characteristic upon energizing the coil. Accordingly, improvement technology for making the electromagnetic characteristic stable is required.

Furthermore, it is demanded to mass-produce the electromagnetic valve at lower cost. To meet this demand, one of the preferable practical ways is that the electromagnetic valve is manufactured through a plurality of sub-assembling processes since, if a certain component part of the electromagnetic valve results in failure or malfunction in one of the sub-assembling processes, only relevant component parts already assembled through the sub-assembling process to include the failure or malfunction component part can be rejected from its manufacturing line and it is not necessary to scrap an entire body of the electromagnetic valve.

SUMMARY OF THE INVENTION

It is an object of the present invention to provide an electromagnetic valve with better electromagnetic characteristic in which a plurality of sub-assemblies of component parts are integrated into one body so that, if a malfunction of a component part occurs during the manufacturing processes, less number of component parts are rejected as failure.

Another object of the present invention is to provide a method of manufacturing the electromagnetic valve mentioned above.

To achieve the above objects, in the electromagnetic valve to be fixed to a base housing for controlling fluid flow therein, a solenoid, which has a bobbin provided inside with a solenoid cylindrical hollow and a coil wound around an outer circumference of the bobbin, is integrated with a housing made of magnetic material into one body to constitute a solenoid assembly in which the housing surrounds an outer circumference of the solenoid. On the other hand, a valve case member, which has a stator and a valve case and is provided inside with a valve case cylindrical hollow extending from the valve case to the stator, is integrated with a valve body member, which has an armature and a valve body, into one body to constitute a valve body assembly in which the valve body member is slidably housed to move reciprocatingly in the valve case cylindrical hollow. The valve body assembly is inserted into the solenoid cylindrical hollow so that the stator is positioned in a vicinity of the coil and an axial end of the housing is partly fixed to an outer circumference of the valve case member to prevent the valve body assembly from dropping out of the solenoid assembly.

With the electromagnetic valve mentioned above, when the coil is energized so as to generate magnetic flux passing through the stator and the armature, the armature together with the valve body is attracted toward the stator with better magnetic characteristic for controlling the fluid flow. Further, since the solenoid assembly and the valve body assembly are independently sub assembled, if a malfunction of a component part incorporated in one of the solenoid assembly and the valve body assembly occurs during manufacturing processes, only component parts constituting the one of the solenoid and valve body assemblies are rejected as failure parts and it is not necessary to scrap an entire body of the electromagnetic valve.

It is preferable that a resin connector for supplying current to the coil is formed by injection molding on the housing to constitute a part of the solenoid assembly. A malfunction of the connector during the manufacturing processes results in failure of only the solenoid assembly and never influences on the valve body assembly.

Further, preferably, the valve case member is provided with a valve case flange protruding radially out of the outer circumference thereof and the axial end of the housing is in contact with and partly fixed to the valve case flange by crimping, staking, welding or press fitting. If a portion where the housing is partly fixed to the valve case flange is disassembled, the solenoid assembly having resin and metal combined component parts can be easily separated from the valve body assembly having only metal component parts, which facilitates a disassembly work of the electromagnetic valve for a resources recycling purpose.

It is preferable that a part of the valve case flange further protrudes radially beyond an outer circumference of the housing so that the valve case flange may be fixed to the base housing. As an alternative, the housing may be provided with a housing flange to be fixed to the base housing so that, when the housing flange is actually fixed to the base housing, the valve case flange is sandwiched between the base housing and the housing flange. The valve case flange or the housing flange serves to easily install the electromagnetic valve on the base housing by fastening, for example, with bolts.

In particular, when the housing flange, not the valve case flange, is fixed to the base housing, connecting force with which the housing and the valve case flange are fixed to each other may be relatively small to an extent that the valve body assembly is tentatively prevented from dropping off the solenoid assembly, since, once the housing flange is fastened to the base housing, the valve case flange is tightly sandwiched between the base housing and the housing flange.

Further, it is preferable that the housing flange is provided with a flange accommodating hole in which the valve case flange is housed and an inner wall of the flange accommodating hole is partly deformed plastically so as to cling to an outer periphery of the valve case flange. This construction has an advantage that, when the electromagnetic valve is disassembled for the resources recycling purpose, the solenoid assembly can be more easily separated from the valve body assembly.

More preferably, the housing flange is provided radially outside the flange accommodating hole with a punch hole so that the inner wall of the flange accommodating hole has a thin thickness portion positioned between the punch hole and the valve case flange. In this case, the thin thickness wall is more easily plastically deformed toward the valve case flange by expanding diameter of the punch hole, for example, with a punch tool.

Moreover, it is preferable that the housing flange completely covers the valve case flange so that, when the housing flange is fixed to the base housing, the valve case flange is not exposed to outside. This construction serves to improve rustproof characteristic of the valve case member.

Further, the housing is, preferably, formed in shape of a cylinder whose axial end is opened and whose another axial end is closed. In this case, the valve body assembly is inserted from an opening side of the housing into the solenoid assembly and the valve body assembly is capped with the solenoid assembly. Accordingly, the valve body assembly is protected from rusting.

Furthermore, it is preferable that the stator and the valve case are integrally formed as a single component part and the stator is provided with a thin wall portion at a position facing the armature so that magnetic flux can pass through the armature by bypassing the thin wall portion. As a result, the electromagnetic valve can be manufactured with less number of component parts and at lower cost.

Further, as the connector is formed by injection molding on the housing before the valve body assembly is assembled to the solenoid assembly, injection pressure of the injection molding never applies to the thin wall portion, which prevents thin wall portion from being deformed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

An electromagnetic valve 30 according to a first embodiment of the present invention, which is applied to a variable discharge high pressure pump P of a common rail fuel injection device for a diesel engine, is described with reference to FIGS. 1 to 5C. The variable discharge high pressure pump P serves to intake low pressure fuel from a fuel tank T and, after pressurizing the low pressure fuel, discharge pressurized fuel to a common rail (not shown). The common rail accumulates fuel with predetermined high pressure corresponding to fuel injection pressure. The variable discharge high pressure pump P is a three line system delivery pump having three pressure chambers 4a, 4b and 4c, in each of which fuel discharge amount to each line system is regulated by the electromagnetic valve 30 (a linear solenoid valve) disposed at an intake fluid passage of the pump P for controlling fuel flow amount. An operation of the electromagnetic valve 30 is controlled by a known electric control unit (ECU) so as to regulate the discharge amount of the variable discharge high pressure pump P so that fuel pressure in the common rail is controlled to an optimum value.

Figure 1:
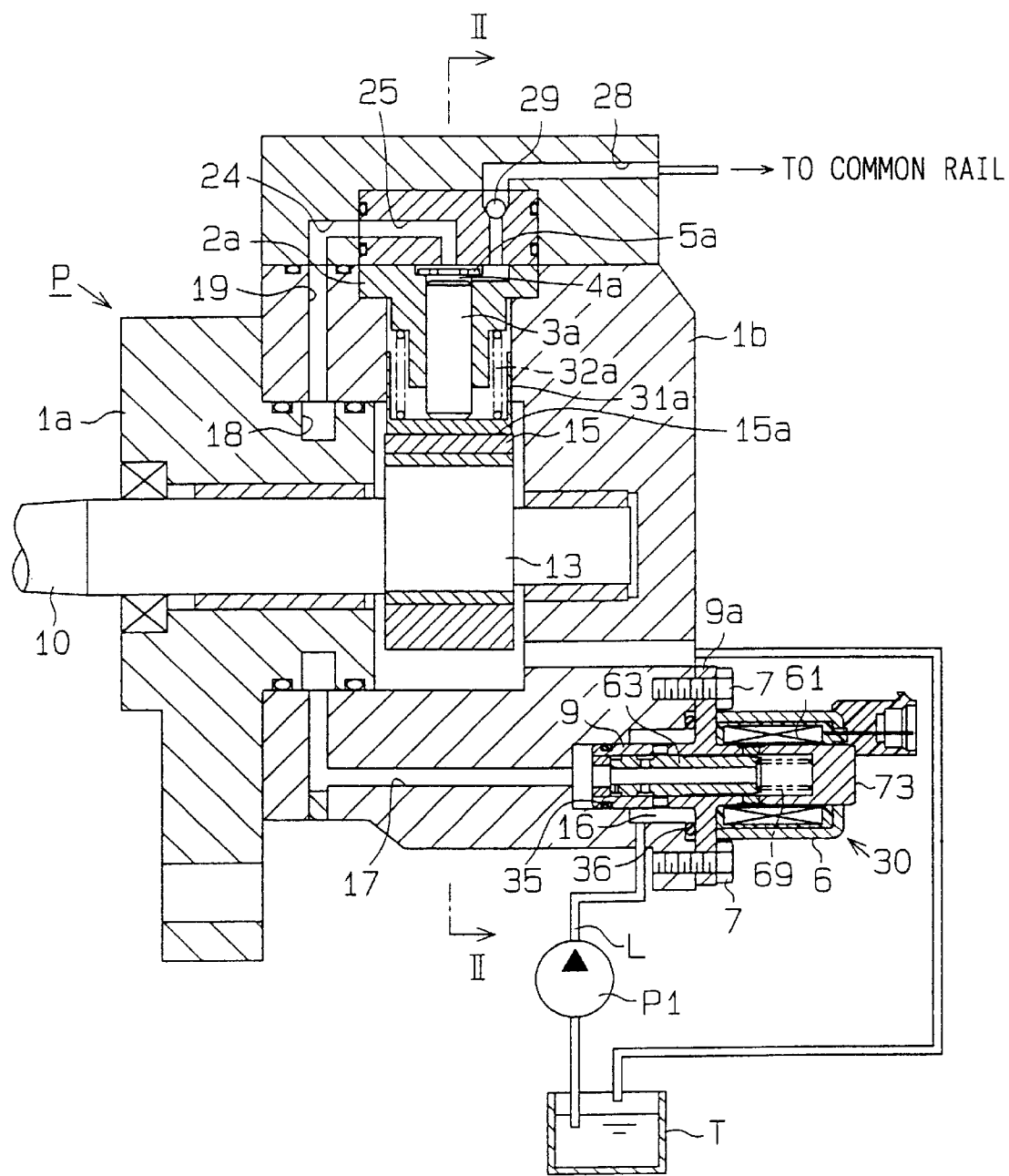
FIG. 1 is a cross sectional view of a variable discharge high pressure pump to which an electromagnetic valve according to a first embodiment is applied.

In the variable discharge high pressure pump P as shown in FIG. 1, a drive shaft 10 is rotatably held in pump housings 1a and 1b. The drive shaft 10 has an eccentric portion 13 on which an eccentric cam 15 is rotatably mounted.

Figure 2:
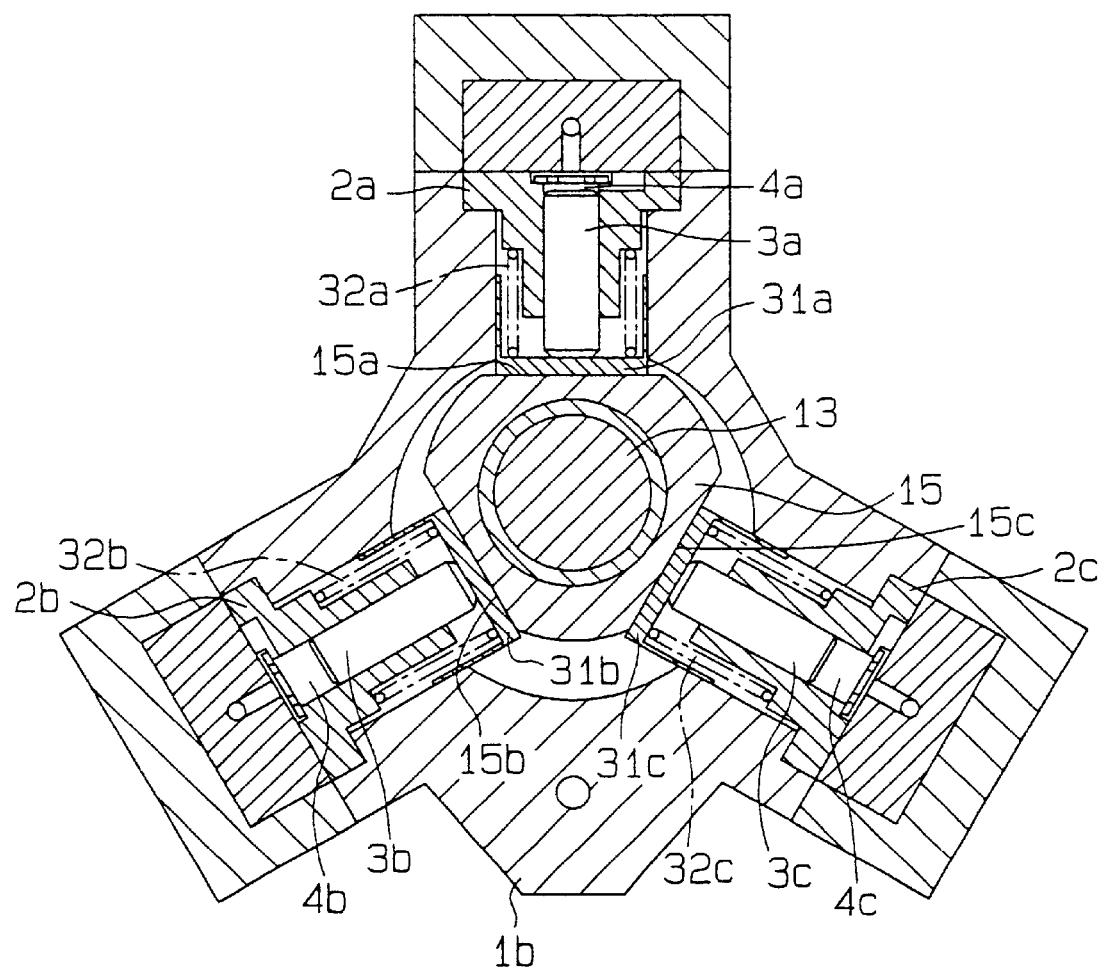
FIG. 2 is a cross sectional view taken along a line II—II of FIG. 1.

As more clearly shown in FIG. 2, the eccentric cam 15 is provided at an outer circumferential surface thereof with three flat surfaces 15a, 15b and 15c. Cylinder bodies 2a, 2b and 2c, in which plungers 3a, 3b and 3c are slidably housed, respectively, are arranged outside the three flat surfaces 15a, 15b and 15c. End faces of the plungers 3a, 3b and 3c and inner circumferential walls of the cylinder bodies 2a to 2c constitute the pressure chambers 4a, 4b and 4c, respectively. The rotation of the eccentric portion 13 following rotation of the drive shaft 10 causes the flat surfaces 15a to 15c of the eccentric cam 15 to move so that the plungers 3a to 3c make reciprocating motion within the cylinder bodies 2a to 2c, respectively. Accordingly, the fuel within the pressure chambers 4a to 4c are pressurized in sequence.

Referring to FIG. 1, the electromagnetic valve 30 is fastened by bolts 7 and fixed to a lower end of the pump housing 1b. A fuel sump 16 is provided around the electromagnetic valve 30. The electromagnetic valve 30 is a linear solenoid valve having a coil 61. A lift amount (moving amount) of a valve body member 63, that is, an opening area of a fuel flow path, is decided according to an amount of current to be applied to the coil 61, as described later in detail.

Fuel in the fuel tank T pressurized by a feed pump P1 is fed to the fuel sump 16 via a low pressure fluid passage L. When the electromagnetic valve 30 is in a valve opening state, low pressure fuel flows from the fuel sump 16 to a low pressure fluid passage 17. The low pressure fluid passage 17 communicates via a ring shaped low pressure fluid passage 18 with a low pressure fluid passage 19 and, then, communicates via fluid passages 24 and 25 with the pressure chamber 4a. Further, the low pressure fluid passage 17 communicates via other low pressure fluid passages (not shown) with the pressure chamber 4b or 4c, too.

A pad 31a, which moves slidably within the pump housing 1b, is disposed between the flat surface 15a of the eccentric cam 15 and the plunger 3a. A spring 32a is arranged between the pad 31a and the cylinder body 2a. Biasing force of the spring 32a causes the pad 31a to be in contact with the flat surface 15a of the eccentric cam 15. Accordingly, when the eccentric cam 15 is operated with an eccentric motion, the pad 31a makes a reciprocating motion together with the flat surface 15a in upward and downward directions in FIGS. 1 and 2.

As the flat surface 15a of the eccentric cam 15 moves downward in FIGS. 1 and 2 according to the rotation of the drive shaft 10, the biasing force of the spring 32a causes the pad 31 to move downward. At this time, if the electromagnetic valve 30 is in valve opening state, low pressure fuel in the fuel sump 16 flows through the low pressure fluid passages 17 to 19 and the fluid passages 24 and 25 to the pressure chamber 4a, thereby causing the plunger 3a to move downward. Fuel flow amount to the pressure chamber 4a is defined by the valve body lift amount (an opening area through which fluid flows) so that, when the regulated amount of fuel flows into the pressure chamber 4a, the plunger 3a is brought away from the pad 31a.

As the flat surface 15a of the eccentric cam 15 moves upward according to the rotation of the drive shaft 10, the pad 31a moves upward against the biasing force of the spring 32a. After the pad 31a comes in contact with the plunger 3a, pressure of the pressure chamber 4a is increased so that high pressure fuel in the pressure chamber 4a is supplied via the high pressure fluid passage 28 to the common rail. A plate 5a and a ball 29 serve as relief valves.

A construction or structure around and related to the pressure chamber 4b or 4c is similar to that around and related to the pressure chamber 4a. That is, a pad 31b or 31c is disposed between the flat surface 15b or 15c and the plunger 3b or 3c and is in contact with the flat surface 15b or 15c due to biasing force of a spring 32b or 32c.

A structure of the electromagnetic valve 30 is described with reference to FIGS. 3A and 3B.

The electromagnetic valve 30 is provided at an inner circumferential surface of a valve case member 9 with a cylinder (cylindrical hollow) 62 in which a valve body member 63 formed in a spool shape is slidably housed. The valve case member 9 is provided with fluid passages 64 and 65 through which the cylinder 62 communicates with the fuel sump 16 shown in FIG. 1. The fluid passage 64 is composed of a slit extending with constant width in an axial direction (upward and downward in FIG. 3B) of the valve body member 63. The slit serves to change the fuel flow path area according to the axial movement of the valve body member 63 so that the fuel flow amount is accurately regulated.

The valve body member 63 is provided with a communicating fluid passage 71 axially extending and penetrating through an inside thereof and, further, with fluid passages 66 and 67 through which the communicating fluid passage 71 communicates with an outer circumferential surface of the valve body member 63. The fluid passage 66 located outside is formed in ring shape so as to communicate with the fluid passage 64 of the valve case member 9 according to the axial movement of the valve body member 63. The communicating fluid passage 71 communicates with the fluid passage 66 through a plurality of the fluid passages 67 located inside. An axial end of the communicating fluid passage 71 is opened to a low pressure fluid passage 17 shown in FIG. 1 and the other axial end thereof is opened to a spring chamber 60 in which a spring 69 is accommodated. The valve body member 63 is opened at both axial ends thereof to minimize fuel pressure acting thereon in the axial direction.

Figure 3A:
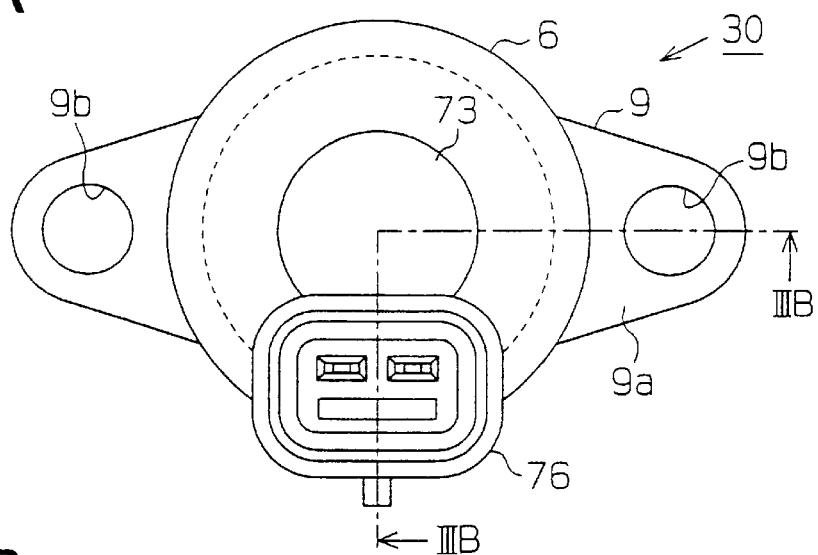
FIG. 3A is an enlarged plan view of the variable discharge high pressure pump of FIG. 1.
Figure 3B:
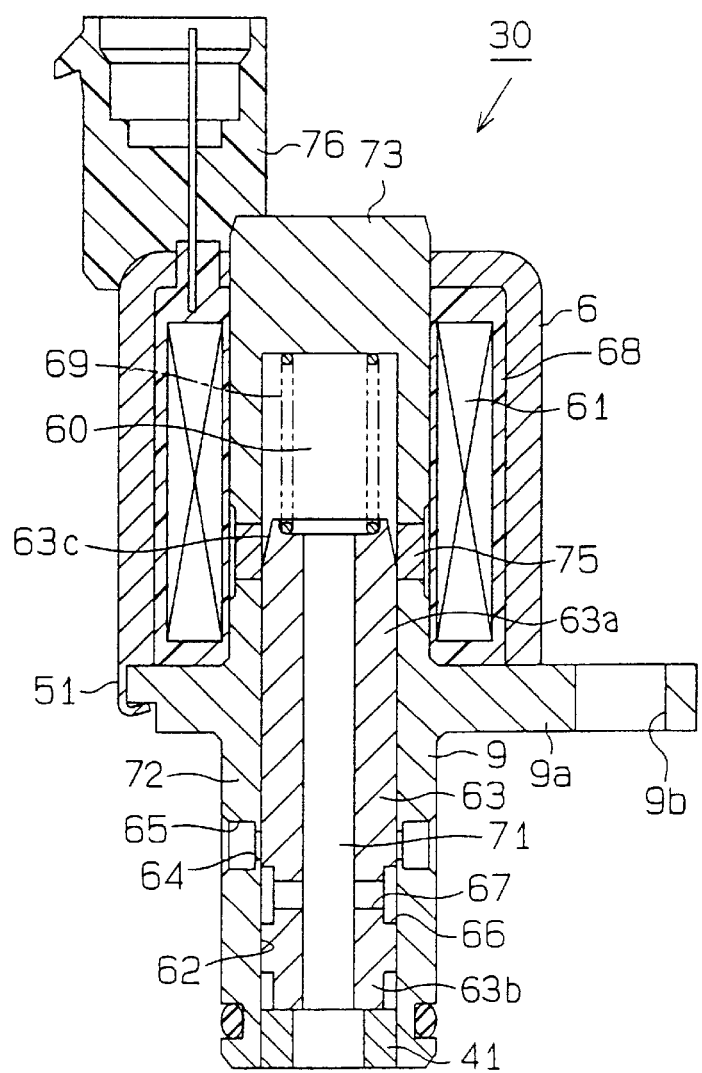
FIG. 3B is a cross sectional view taken along a line IIIB—IIIB of FIG. 3A.

A stopper 41 is press fitted to the valve case member 9 on lower side in FIG. 3B. The valve body member 63 is urged toward the stopper 41 by the spring 69. The stopper 41 serves to define an allowable travel range of the valve body member 63 in the valve closing state.

The valve case member 9 is provided at an upper part thereof with a stator 73 and at a lower part thereof with a valve case 72, as shown in FIG. 3B. An upper side of the stator 73 is connected via an inserting member 75 made of non-magnetic material (for example, austenite based stainless steel SUS 304) to a lower side thereof. The upper and lower sides of the stator 73 and the inserting member 75 are coaxially bonded to one another by laser welding so that the valve case 72 and the stator 73 are integrated into one body to constitute the valve case member 9. The inserting member 75 is positioned at a place facing a taper portion 63c of the valve body member 63.

The valve body member 63 is provided at an upper part thereof with an armature 63a and at a lower part thereof with a valve body 63b. The armature 63a and the valve body 63b are formed as one component part.

The valve body member 63 is urged in the valve closing direction by the spring 69 and, when the coil 61 is not energized, the valve body member 63 is in contact with the stopper 41 defining the allowable travel range of the valve body member 63 in the valve closing state. In the valve closing state, the communication between the fuel sump 16 and the low pressure fluid passage 17 is interrupted, as shown in FIG. 1. When the coil 61 is energized, the valve body member 63 moves against the biasing force of the spring 69 in the valve opening direction so that the fuel sump 16 communicates with the low pressure fluid passage 17. The valve body member 63 rests at a position where a magnetic force of attracting the valve body member 63 toward the upper side of the stator 73 balances with the biasing force of the spring 69 so that an allowable travel range of the valve body member 63 in the valve opening state is defined. The amount of current to be applied to the coil 61 decides a displacement position of the valve body member 63 and, as the current increases, the opening area of the fluid passage, that is, the fuel flow path area increases.

The coil 61 is housed in a resin bobbin 68 and the coil 61 and the bobbin 68 constitute a solenoid portion. A housing 6 made of magnetic material surrounds an outer surface of the solenoid portion. A resin connector 76 for leading an electric signal to the coil 61 is formed on the housing 6 by injection molding.

The valve case member 9 is provided with a flange 9a partly protruding radially outside an outer circumference of the housing 6 and having through-holes 9b through which the bolts 7 are inserted for fastening the electromagnetic valve 30 to the housing 1b of the variable discharge high pressure pump P, as shown in FIG. 1.

The housing 6 is fixed to the valve case member 9 by crimping or staking. The housing 6 is provided at an opening end thereof on a side of the valve case member 9 with a thin wall portion 51 that is plastically deformed by crimping or staking and fixed to the flange 9a of the valve case member 9.

Figure 4:
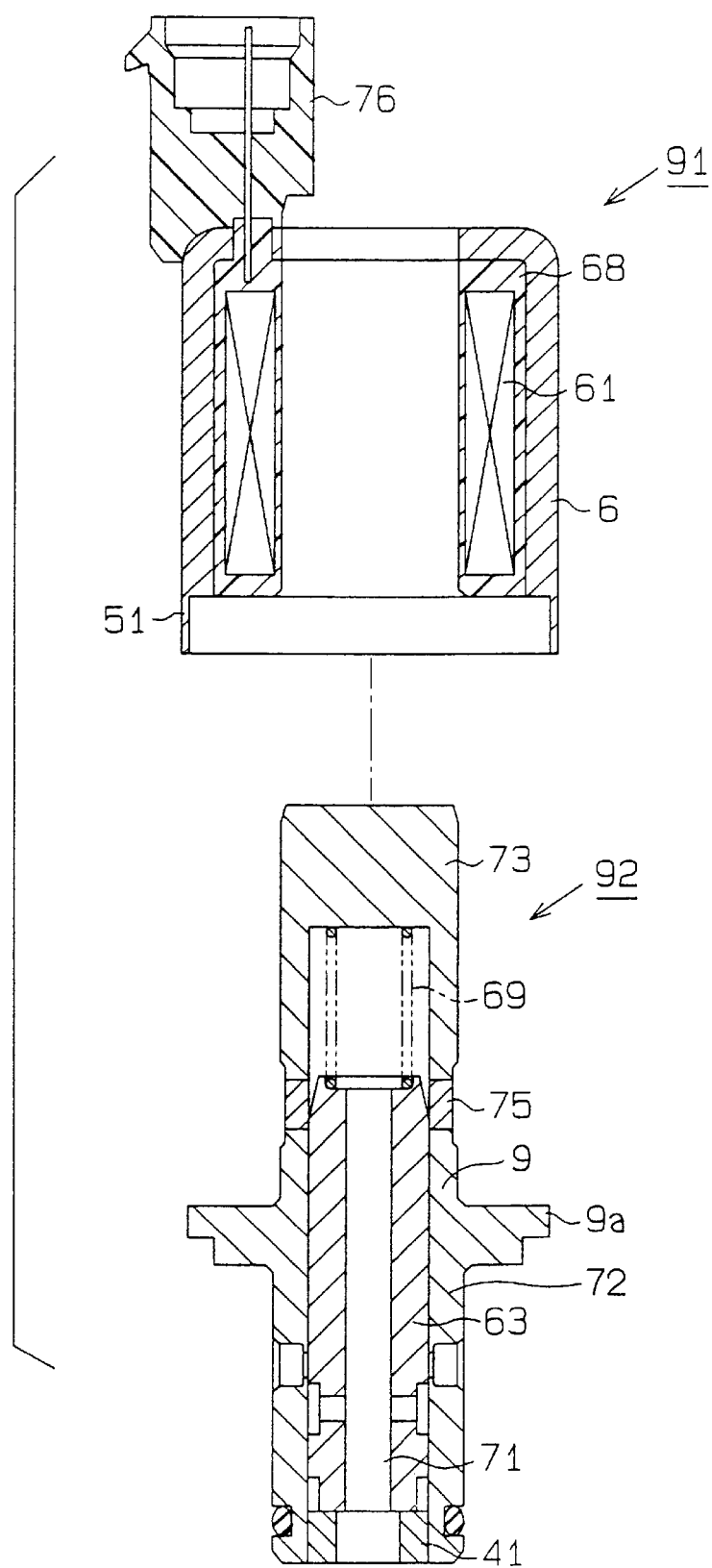
FIG. 4 is an exploded cross sectional view of the electromagnetic valve of FIG. 1.

On manufacturing the electromagnetic valve 30, as shown in FIG. 4, the coil 61, the bobbin 68, the housing 6 and the connector 76 are formed into an integrated body to constitute a solenoid assembly 91. On the other hand, the valve case member 9 (including the valve case 72 and the stator 73), the spring 69, the valve body member 63 and the stopper 41 are formed into an integrated body to constitute a valve body assembly 92. Then, the valve body assembly 92 is assembled to the solenoid assembly 91 in such a manner that the valve case member 9 is inserted into a cylindrical hollow of the bobbin 68 until an axial end of the housing 6 comes in contact with the flange 9a and, then, the thin wall portion 51 is fixed to the flange 9a by crimping or staking.

Figure 5A:
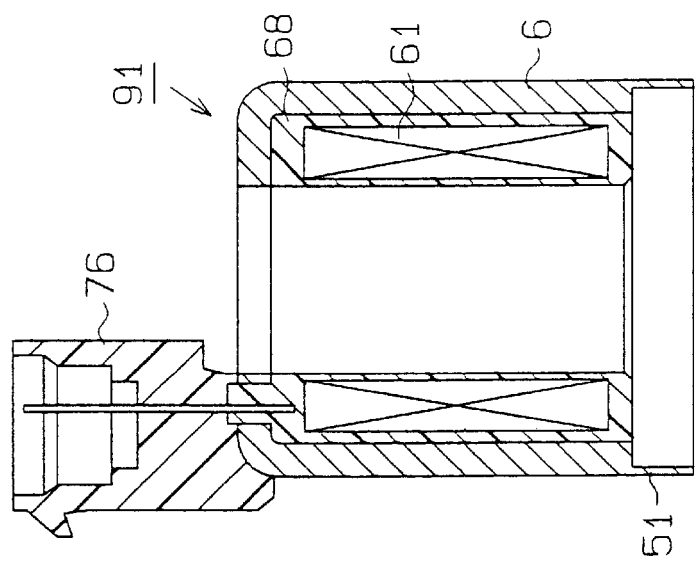
FIGS. 5A to 5C are cross sectional views of a solenoid assembly of the electromagnetic valve of FIG. 1 sequentially in manufacturing processes.
Figure 5B:
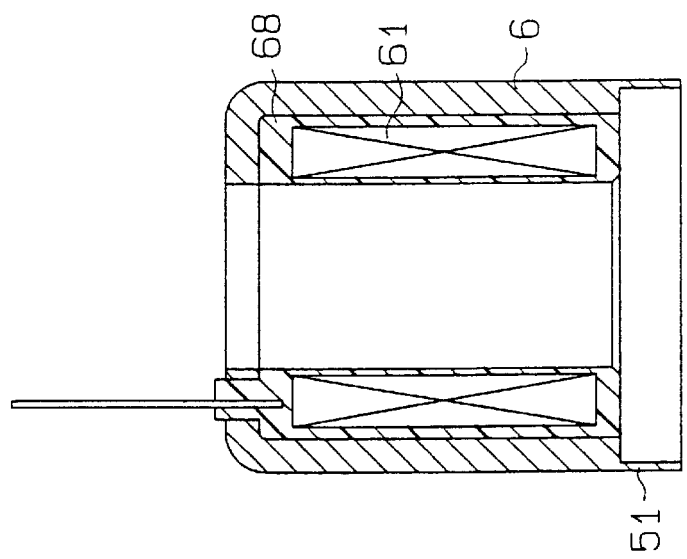
Figure 5C:
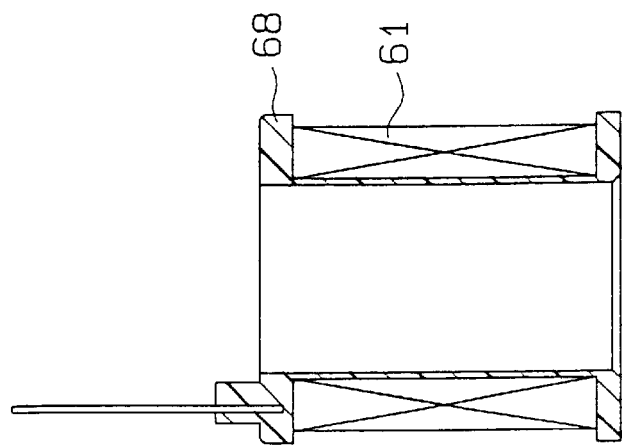

Manufacturing processes of the solenoid assembly 91 is described with reference to FIGS. 5A to 5C. At first, the coil 61 is wound on the bobbin 68 that is roughly cylindrical to form the solenoid portion, as shown in 5A. Next, the housing 6 is mounted on the solenoid portion so as to cover the same, as shown in FIG. 5B. Then, the connector 76 is formed on the housing 6 by injection molding. In this case, if the injection molding of the connector 76 results in a malfunction by some reasons, only component parts of the solenoid assembly 91, that is, component parts not including the valve assembly 92, become failure ones.

Further, according to the first embodiment, the valve body member 63 has both of a valve function and an armature function. One is an inherent function as a valve body (the valve body 63b) for changing the fluid flow path area according to a sliding movement in the cylinder 62. The other one is a function as an armature (the armature 63a) for forming a magnetic circuit. On the other hand, the valve case member 9 has both of a function as a cylinder (valve body 72) in which the valve body member 63 is slidably held and a function as a stator (the stator 73) for forming a magnetic circuit and attracting the valve body member 63.

To achieve the both of cylinder and the stator functions, the valve body member 63 is made of soft magnetic material such as pure iron or low carbon steel and a thin hardened layer is formed on the soft magnetic material thereof by NiP plating (nickel/phosphorous plating). Further, the valve case member 9 is made of soft magnetic material such as electromagnetic stainless steel (ferrite based stainless steel SUS 13) and a thin hardened layer is formed on a surface of the valve case member 9 (cylinder 62) by NiP plating. Accordingly, the valve body member 63 and the valve case member 9 can be slidably operated with less wear resistance and lower frictional force without damaging the magnetic characteristic. Instead of conducting NiP plating, the soft nitride heat treatment or DLC ceramic coating may be conducted on the valve body member 63 or the valve case member 9. With the thin hardened layer, the valve body member 63 moves smoothly inside the cylinder 62 of the valve case member 9.

In the electromagnetic valve 30 mentioned above, the housing 6 is assembled so as to surround the solenoid portion (The coil 61 and the bobbin 68), which results in protecting the solenoid portion. Further, the housing 6 forms a magnetic circuit when the coil 61 is energized so that the magnetic characteristic is further improved.

Further, since the solenoid assembly 91 and the valve body assembly 92 can be easily separated, failure of a component part in one of the solenoid assembly 91 and the valve body assembly 92 does not cause component parts in the other of the solenoid assembly 91 and the valve body assembly 92 to be scraped. For example, failure of the connector 76 on injection molding results in a malfunction of only the solenoid assembly 91 and it is not necessary to scrap the valve body assembly 92, since the connector 76 is formed in the solenoid assembly 91 before the valve body assembly 92 is assembled to the solenoid assembly 91. According, when the failure occurs, least number of component parts can be scraped, so the electromagnetic valve can be manufactured at less cost.

Furthermore, since the solenoid assembly 91 is fixed to the valve body assembly 92 by engaging the thin wall portion 51 of the housing 6 with the valve case member 9 by crimping or staking, the solenoid assembly 91 and the valve body assembly 92 can be easily separated only by disengaging the thin wall portion 51 of the housing 6 with the valve case member 9. That is, the valve body assembly 92 made of only metal and the solenoid assembly 91 made of a composite of metal and resin is easily separable. This has an advantage that a resources recycling operation is easy.

Moreover, the valve body member 63 has both of the valve function and the armature function as one component part and the valve case member 9 has both of the cylinder function and the stator function as one body. Therefore, the electromagnetic valve 30 is composed of the less number of parts, resulting in less manufacturing cost.

As mentioned above, the electromagnetic valve 30 adequately regulates fuel discharge amount from the variable discharge high pressure pump P so that control accuracy of common rail pressure is improved.

Second Embodiment

An electromagnetic valve 100 according to a second embodiment is described with reference to FIG. 6.

Figure 6:
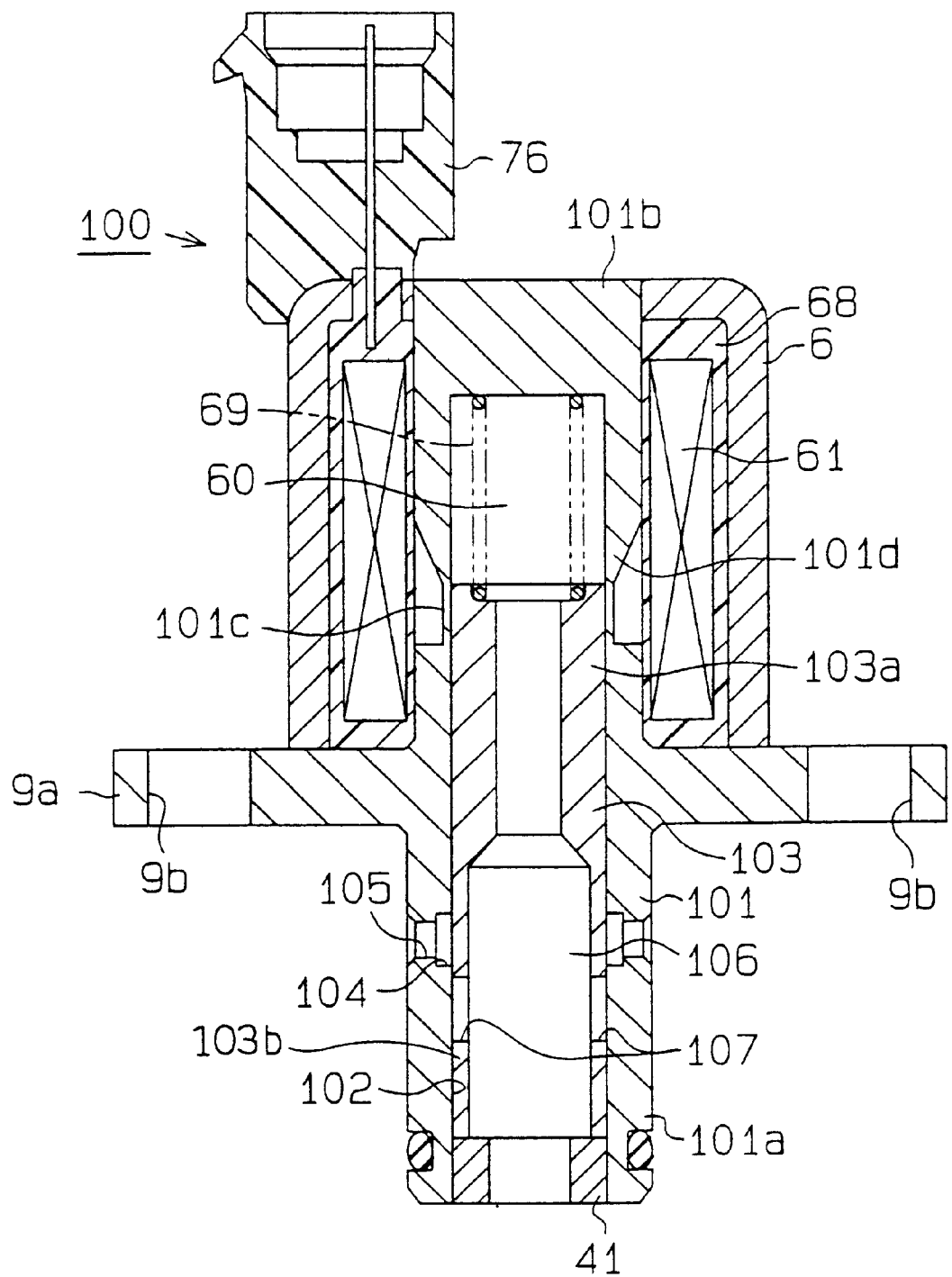
FIG. 6 is a cross sectional view of an electromagnetic valve according to a second embodiment.

According to the electromagnetic valve 100 shown in FIG. 6, a valve case member 101 is a one component part having an integrated stator and valve case functions, instead of the valve case member 9 in which the stator 73 has the inserting member 75 bonded thereto, as shown in FIGS. 3A and 3B.

As shown in FIG. 6, in the electromagnetic valve 100, the valve case member 101 is provided with a cylinder (cylindrical hollow) 102. A valve body member 103 constituting a moving member is slidably housed in the cylinder 102. The valve case member 101 has a valve accommodating portion or a valve case 101a (a lower portion including the flange 9a in FIG. 6) and a stator 101b. The valve accommodating portion 101a, in which the valve body member 103 is housed, has the same construction as the valve case 72 of the valve case member 9 shown in FIGS. 3A and 3B. The stator 101b has the stator function for constituting the magnetic circuit. The valve body member 103 has a valve body 103b serving as the inherent valve function for changing the fuel flow path area and an armature 103a serving as the armature function for constituting the magnetic circuit, which is the same as the valve body member 63 shown in FIGS. 3A and 3B.

The valve case member 101 is provided with fluid passages 104 and 105. The valve body member 103 is provided with a communicating fluid passage 106 extending axially to penetrate an inside thereof and two fluid passages 107 through which the communicating fluid passage 106 communicate with an outer circumferential surface thereof.

The upper side of the stator 101b is an armature attracting portion toward which the armature 103a of the valve body member 103 is attracted on energizing the coil 61. The armature attracting portion is integrally connected via a thin thickness wall 101c to the lower side of the stator 101b. That is, the stator 101b having the thin thickness wall 101c and the valve case 101*a* are formed as a single component part constituting the valve case member 101. The thin thickness wall 101*c* has a taper portion 101*d* whose outer diameter is smaller toward the valve body member 103 (the armature 103*a*).

When the coil 61 is energized, magnetic flux passing through the valve case member 101 is throttled and restricted by the thin thickness wall 101*c* and, while by passing thin thickness wall 101*c*, mainly passes through the armature 103*a* of the valve body member 103 from or to the armature attracting portion of the stator 101*b*. Therefore, the valve body member 103 (the armature 103*a*) is attracted toward the attracting portion of the stator 103*b* and the valve body member 103 moves to a given position against the biasing force of the spring 69. Thus, fluid passages 104 and 105 communicate with the fluid passages 107 so that fuel flows by an amount responsive to areas of the fluid passages 107 opened to the fluid passage 104.

If the thin thickness wall 101*c* is too thin, a strength problem occurs. To the contrary, if the thin thickness wall 101*c* is too thick, magnetic flux passes too much through the thin thickness wall 101*c* so that performance of the electromagnetic valve 100 is damaged. The thickness of the thin thickness wall 101*c* has to be defined in consideration of the strength and the performance and, in this embodiment, for example, 0.3 to 0.7 mm is preferable.

According to the electromagnetic valve 100, the coil 61, the bobbin 68, the housing 6 and the connector 76 constitute a subassembly (the solenoid assembly). The valve case member 101, the valve body member 103 and so on constitute another subassembly (the valve body assembly). The solenoid assembly and the valve body assembly, which are independently manufactured, are assembled to each other, similarly to the first embodiment. If a malfunction of the connector 76 occurs on injection molding, only the solenoid assembly may be scraped and it is not necessary to scrap the valve body assembly.

Further, since the valve case 101*a*, and the stator 101*b* including the thin thickness wall 101*c* are formed as the single component part constituting the valve case member 101, the electromagnetic valve 100 can be manufactured with less number of component parts and at lower cost.

Furthermore, as the connector 76 is formed by injection molding on the housing 6 before the valve body assembly (the valve case member 101) is assembled to the solenoid assembly (the housing 6), injection pressure of the injection molding never applies to the thin thickness wall 101*c*, which prevents thin thickness wall 101*c* from being deformed.

Figure 7:
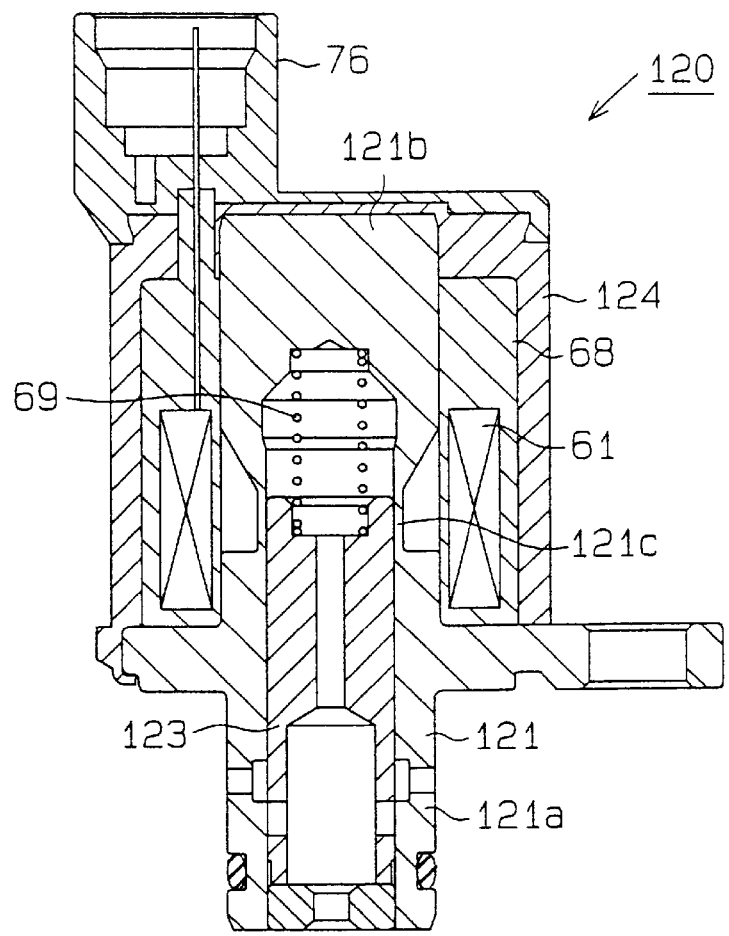
FIG. 7 is a cross sectional view of a modification of the electromagnetic valve according to the second embodiment.
Figure 10:
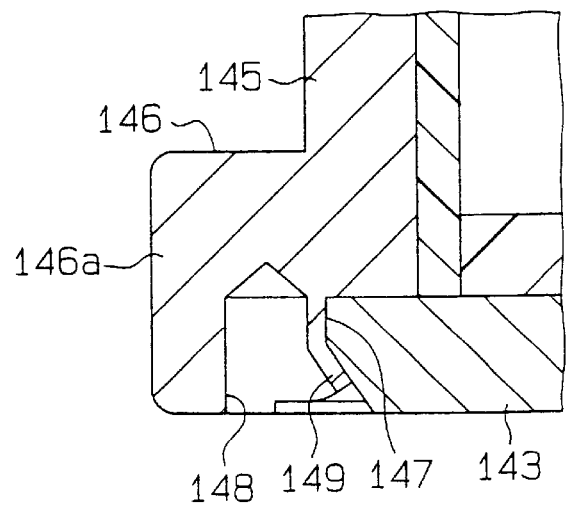
FIG. 10 is an enlarged cross sectional view of a part of the electromagnetic valve of FIG. 9.
Figure 8A:
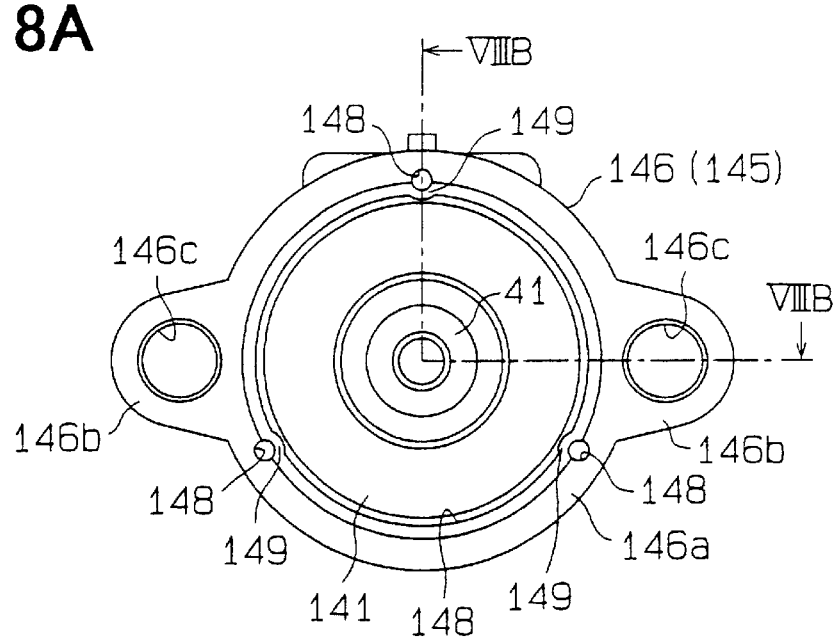
FIG. 8A is a cross sectional plan view of an electromagnetic valve according to a third embodiment.
Figure 8B:
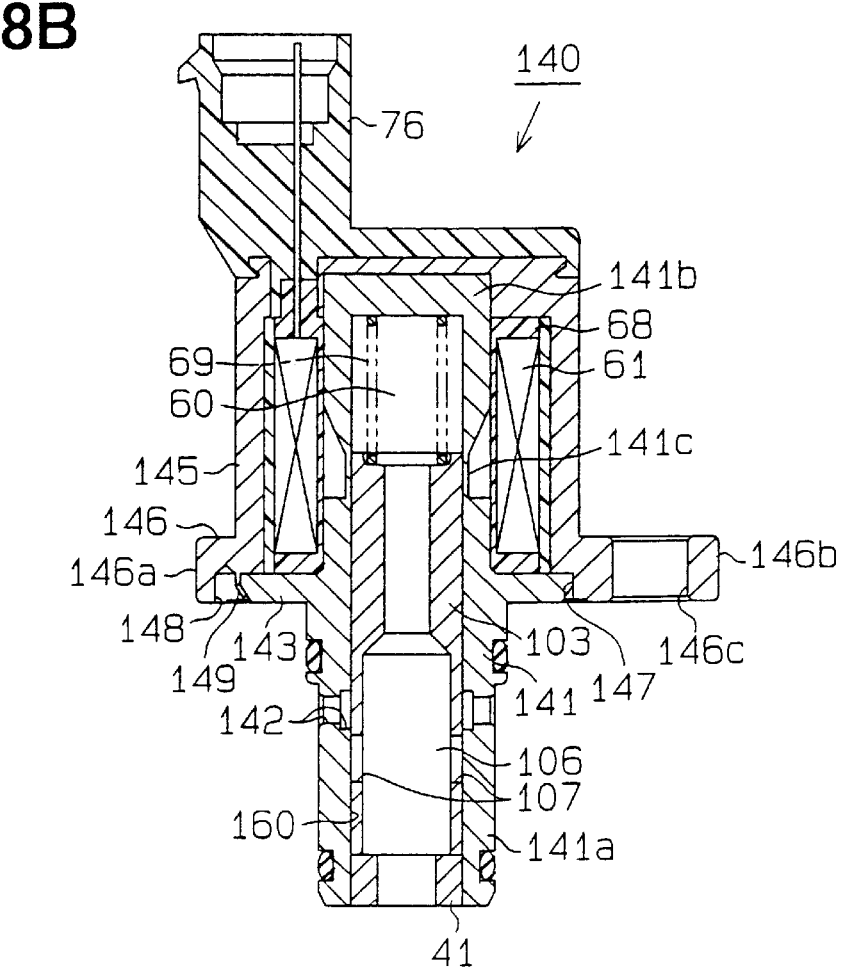
FIG. 8B is a cross sectional view taken along a line VIIIB—VIIIB of FIG. 8A.

As an alternative, the electromagnetic valve 100 may be modified to an electromagnetic valve 120 as shown in FIG. 7.

According to the electromagnetic valve 120, a housing 124, which constitutes a part of the solenoid assembly, is formed in a shape of a cylinder having a bottom. The bottom of the housing 124 covers an axial end of a valve case member 121 which constitutes a part of the valve case assembly.

The valve case member 121 is provided with an armature attracting portion of a stator 121*b* toward which a valve body 123 is attracted on energizing the coil 61. The armature attracting portion 121*b* is connected via a thin thickness wall 121*c* to a lower side of the stator 121*b* adjacent a valve case or a valve accommodating portion 121*a*. That is, the valve case 121*a* and the stator 121*b* including the thin thickness wall 121*c* are formed as a single component part constituting the valve case member 121. A construction of the valve body member 123 is same as that of the valve body member 103. The solenoid portion composed of the coil 61 and the bobbin 68 is assembled to a housing 124 and the connector 76 is formed by injection molding on the housing 124.

The electromagnetic valve 120 has not only the same advantages as the electromagnetic valve 100 shown in FIG. 6, but also an advantage that the valve body assembly is not exposed to outside since the bottom of the housing 124 covers the stator 121*b* of the valve assembly. Accordingly, the housing 124 protects the valve body assembly, in particular, the thin thickness wall 121*c* from an outside force.

Third Embodiment

An electromagnetic valve 140 according to a third embodiment is described with reference to FIGS. 8A to 10.

According to the third embodiment, the valve body assembly (a valve case member 141) is fixed to the solenoid assembly (a housing 145) with the least number of fixing points.

The valve case member 141 is composed of a valve case 141*a*, a stator 141*b*, a thin thickness wall 141*c* and fluid passages 142, which are generally same as those of the valve case member 101 shown in FIG. 6. The valve case member 141 is different from the valve case member 101 in that the flange 143, whose outward protruding width is circumferentially constant, is smaller than that of the valve case member 101.

The housing 145 surrounds the solenoid portion (the coil 61 and the bobbin 68), which is similar to the housing 6 or 124 shown in FIG. 6 or 7. The housing 145 is different from the housing 6 or 124 in that the housing 145 is provided with a flange 146 through which the electromagnetic valve 140 is fastened and fixed to the pump housing 1*b*. The flange 146 has a ring shaped cover portion 146*a* that encompasses the flange 143 of the valve case member 141 and two fixing portions 146*b* that protrude outward circumferentially out of the ring shaped cover portion 146*a*. Each of the fixing portion 146*b* has a hole 146*c* through which a fastening bolt is inserted.

To improve wear characteristic of the valve case member 141, a hardening treatment such as soft nitride heat treatment is conducted on the valve case member 141. It is not preferable, after the hardening treatment is conducted, to further conduct plating treatment on the valve case member 141 for improving rustproof characteristic since plating layer is coated on a cylinder 160 inside the valve case member 141, on which the valve body member 103 slides. The plating layer adversely affects on the magnetic characteristic, since the plating layer tends to prevent magnetic flux from passing between the valve case member 141 and the valve body member 103. If the flange 9*a* of the valve case 103 without the rustproof treatment is exposed to outside as shown in FIG. 6, rust is likely produced during its use. However, according to the electromagnetic valve 140, the flange 143 of the valve case member 141 is covered with the cover portion 146*a* of the housing 145 and is not exposed to outside when the electromagnetic valve 140 is assembled to the variable discharge high pressure pump P. Accordingly, the valve case member 141 is unlikely to rust, even if a vehicle incorporating the variable discharge high pressure pump P installed on the engine cruises near a seashore and the electromagnetic valve 140 is exposed to salty moisture environment. The housing 145 is made of iron base material and surface treated by zinc plating for securing the rustproof.

Figure 9:
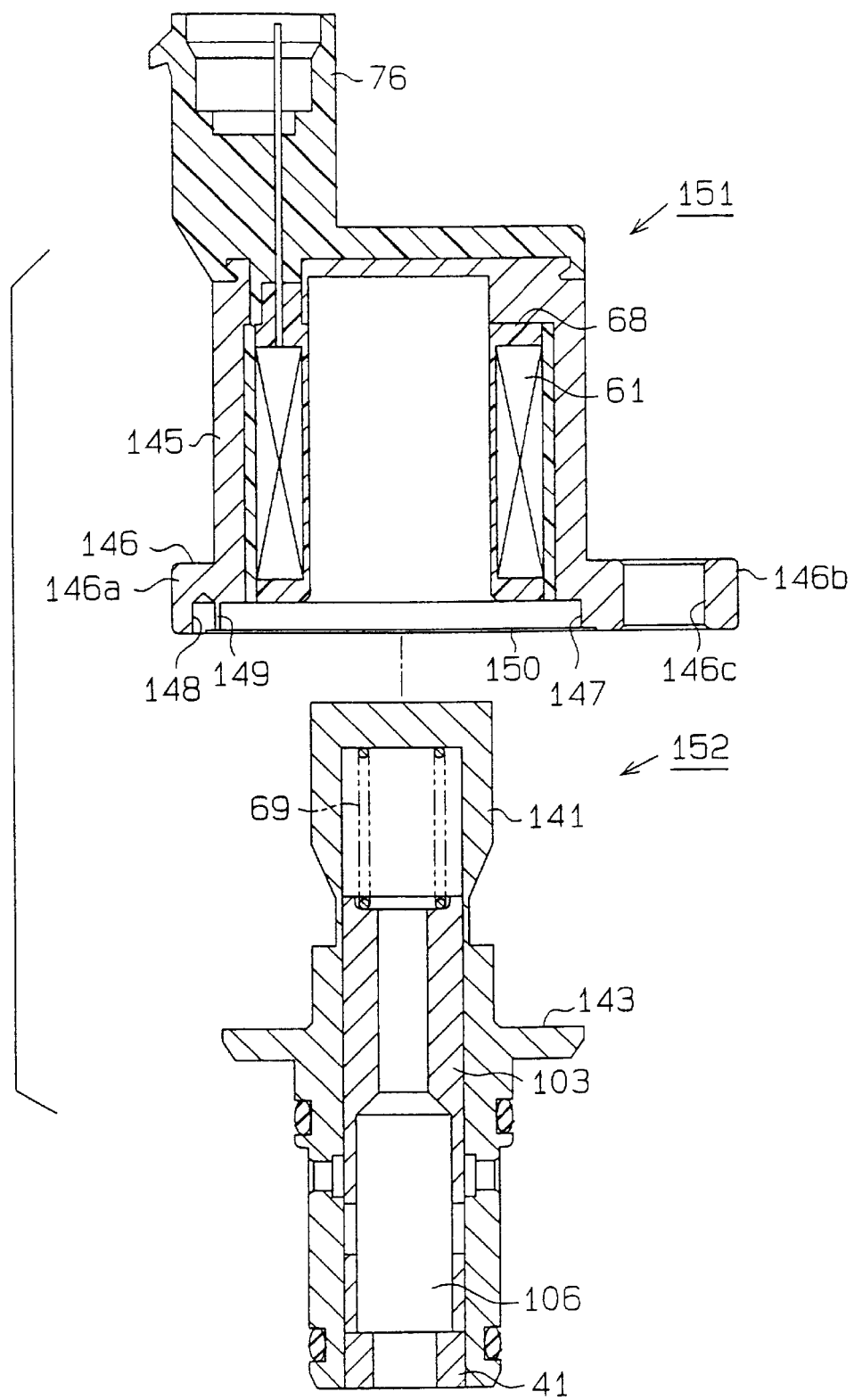
FIG. 9 is an exploded cross sectional view of the electromagnetic valve of FIG. 8B.

To manufacture the electromagnetic valve 140, a solenoid assembly 151 and a valve body assembly 152 are independently sub assembled, respectively, as shown in FIG. 9. Then, the valve body assembly 152 is assembled to the solenoid assembly 151 to make an integrated body in such a manner that, after the valve case member 141 is axially inserted into a cylindrical hollow of the bobbin 68, the housing 145 and the valve case member 141 are fixed to each other by crimping.

The flange 146 of the housing 145 is provided inside with a flange accommodating hole 147, in which the flange 143 of the valve case member 141 is housed, three cylindrical crimping holes 148 positioned radially outside the flange accommodating hole 147 and three thin thickness walls 149 each arranged between each of the holes 148 and the flange accommodating hole 147. Thickness of the thin thickness wall 149 is about 0.4 to 0.6 mm.

After the valve case member 141 is axially inserted into the hollow of the bobbin 68 until the flange 143 is fitted to the flange accommodating hole 147 to assemble the valve body assembly 152 to the solenoid assembly 151, each of the thin thickness walls 149 is plastically deformed radially inward by inserting a crimping tool (punch) into each of the holes 148 so that each of the thin thickness walls 149 clings to an outer circumference of the valve case member 141 (chamfering portion on an outer circumference of the flange 143).

It should be noted that, when the thin thickness wall 149 is deformed, a free end of the thin thickness wall 149 does not protrude out of an end face of the housing 145 so that a surface of the flange 146 may comes in flat contact with the pump housing 1b. Accordingly, it is preferable that the housing 145 is provided on the end face thereof around the flange accommodating hole 147 with a counter bore 150, as shown in FIG. 9.

Then, the solenoid assembly 151 and the valve body assembly assembled to each other at the three points by crimping (or staking) and integrated into one body is firmly installed on the pump housing 1b in such a manner that the fixing portion 146b of the flange 146 is fastened by bolts to the housing 1b. Accordingly, the flange 143 of the valve case member 141 is sandwiched between and completely encompassed by the housing 145 and the pump housing 1b.

In this case, even if crimping connection between the valve case member 141 and the housing 145 comes loose, the electromagnetic valve 140 can be tightly fixed to the pump housing 1b since the housing 145 is fastened to the pump housing 1b by the bolts. Therefore, it is sufficient to crimp the thin thickness walls 149 at three spot positions of the outer circumference of the valve case member 141, or to plastically deform a part of the housing 145 by crimping or staking at least at one spot position outside the valve case member 141, to an extent that the valve case member 141 does not separate from the housing 145 when the electromagnetic valve 140 is fixed to the pump housing 1b.

According to the third embodiment mentioned above, the valve case member 141 (valve body assembly 152) and the housing 145 (solenoid assembly 151) can be easily disassembled, when a malfunction of a component part thereof occurs, since a part of the housing 145 is plastically deformed tentatively at a limited number of spot positions. This construction serves to facilitate an easy classification of component parts for a resources recycling purpose.

Further, since the flange 143 of the valve case member 141 is not press fitted to the flange accommodating hole 147 of the housing 145 but relatively loosely inserted thereto and assembled by crimping to the housing 145, the integration of the solenoid assembly 151 into the valve body assembly 152 is easy. Further, since the flange 141 is not press fitted to the flange accommodating hole 147, it is not necessary to control accurately thickness dimension of zinc plating layer when the zinc plating is conducted on the housing 145 so that the manufacturing of the electromagnetic valve 140 is easier. Moreover, there are no risks due to the press fitting that the zinc plating layer is torn off and, further, the valve case member 141 is deformed to an extent that the magnetic characteristic deteriorates.

As mentioned above, the cover portion 146a of the housing 145 completely covers the flange 143 of the valve case member 141 and the valve case member 141 is never exposed to outside so that the rustproof of the valve case member 141 is sufficiently achieved.

Each of the crimping holes 148 is not limited to the cylindrical hole but may be an elongated hole like rectangular one. Further, as an alternative, without providing the crimping holes 148, an inner wall periphery of the housing 145 surrounding the flange 143 of the valve case member 141 may be plastically deformed.

In the first to third embodiments, a method of the connection between the solenoid assembly and the vale body assembly is not limited to the crimping or staking, but may be any connecting means such as welding or press fitting, as far as the valve case of the valve body assembly can be relatively easily separated from the housing of the solenoid assembly.

Moreover, instead of the valve body member or the valve case member that is formed as the single component part, the valve body member or the valve case member may be a composite valve body member or a composite valve case member that is formed of a plurality of component parts and are integrated into one body by connecting means. For example, to manufacture the valve body member, a component part having the armature function (armature) may be press fitted to a component part having the inherent valve function (valve body). Further, to manufacture the valve case member, a component part having the stator function (stator) may be welded to a component part having the inherent valve case function (valve case).

Instead of the normally closed electromagnetic valve that is in valve closing state when the coil is not energized, the electromagnetic valve may be a normally open valve or a valve in which a fluid flow path area is slightly opened when the coil is not energized. For example, the electromagnetic valve 30 shown in FIGS. 3A and 3B may be modified in such a manner that the fluid passage 64 is slightly opened to the fluid passage 66 and the fluid flow path area increases as the amount of current applied to the coil increases.

Instead of the linear solenoid valve (proportional electromagnetic valve), the electromagnetic valve may be an on-off valve in which a valve body moves between predetermined valve opening and closing positions.

Instead of applying the electromagnetic valve to the variable discharge high pressure pump, the electromagnetic valve may be used as a fuel injection valve or may be applied to any fluid flow control device such as a brake device having ABS (anti-lock braking system) or a hydraulic control device for controlling operation oil.

What is claimed is:

1. An electromagnetic valve to be fixed to a base housing for controlling fluid flow therein, comprising:
    a solenoid assembly having at least a solenoid and a housing which are integrated into one body, the solenoid having a bobbin whose inside is provided with a solenoid cylindrical hollow and a coil wound around an outer circumference of the bobbin, and the housing being made of magnetic material and surrounding an outer circumference of the solenoid; and a valve body assembly having at least a cylindrical valve case member and a cylindrical valve body member which are integrated into one body, the valve case member having a stator and a valve case, being inserted into the solenoid cylindrical hollow so that the stator is positioned in a vicinity of the coil and being provided in side with a valve case cylindrical hollow extending from the valve case to the stator, and the valve body member having an armature and a valve body and being slidably housed to move reciprocatingly in the valve case cylindrical hollow so that, when the coil is energized so as to generate magnetic flux passing through the stator and the armature, the armature together with the valve body is attracted toward the stator for controlling the fluid flow, wherein an axial end of the housing is fixed partly to an outer circumference of the valve case member to prevent the valve body assembly from dropping out of the solenoid assembly.

2. An electromagnetic valve according to claim 1, further comprising:

a resin connector for supplying current to the coil, the connector being formed by injection molding on the housing to constitute a part of the solenoid assembly.

3. An electromagnetic valve according to claim 1 wherein the valve case member is provided with a valve case flange protruding radially out of the outer circumference thereof and the axial end of the housing is in contact with and fixed to the valve case flange.

4. An electromagnetic valve according to claim 3, wherein a part of the valve case flange further protrudes radially beyond an outer circumference of the housing so that the valve case flange may be fixed to the base housing.

5. An electromagnetic valve according to claim 3, wherein the housing is provided with a housing flange protruding radially out of the outer circumference thereof which is to be fixed to the base housing so that, when the housing flange is actually fixed to the base housing, the valve case flange is sandwiched between the base housing and the housing flange.

6. An electromagnetic valve according to claim 5, wherein the housing flange is provided with a flange accommodating hole in which the valve case flange is housed and an inner wall of the flange accommodating hole is partly deformed plastically so as to cling to an outer periphery of the valve case flange.

7. An electromagnetic valve according to claim 6, wherein the housing flange is provided radially outside the flange accommodating hole with a punch hole so that the inner wall of the flange accommodating hole has a thin thickness portion positioned between the punch hole and the valve case flange and the thin thickness wall is plastically deformed toward the valve case flange by partly expanding diameter of the punch hole.

8. An electromagnetic valve according to claim 5, wherein the housing flange completely covers the valve case flange so that, when the housing flange is fixed to the base housing, the valve case flange is not exposed to outside.

9. An electromagnetic valve according to claim 1, wherein the housing is formed in shape of a cylinder whose axial end is opened and whose another axial end is closed so that the valve body assembly is capped with the solenoid assembly.

10. An electromagnetic valve according to claim 1, wherein the stator and the valve case are integrally formed as a single component part and the stator is provided with a thin wall portion at a position facing the armature so that the magnetic flux passes through the armature by bypassing the thin wall portion.

11. A method of manufacturing an electromagnetic valve including a solenoid having a bobbin provided inside with a solenoid cylindrical hollow and a coil wound around an outer circumference of the bobbin, a housing made of magnetic material, a valve case member having a stator and a valve case and being provided inside with a valve case cylindrical hollow extending from the valve case to the stator, and a valve body member having an armature and a valve body, comprising steps of:

forming a solenoid assembly in which the solenoid and the housing are integrated into one body so that the housing surrounds an outer circumference of the solenoid, forming a valve body assembly in which the valve case member and the valve body member are integrated into one body so that the valve body member is slidably housed to move reciprocatingly in the valve case cylindrical hollow, inserting the valve body assembly axially into the solenoid cylindrical hollow so that the stator is positioned in a vicinity of the coil, and fixing partly an axial end of the housing to an outer circumference of the valve case member to prevent the valve body assembly from dropping out of the solenoid assembly.

12. A method of manufacturing an electromagnetic valve according to claim 11, the electromagnetic valve including a resin connector for supplying current to the coil, further comprising steps of:

forming the connector on the housing by injection molding after forming the solenoid assembly but before forming the valve body assembly.

13. A method of manufacturing an electromagnetic valve according to claim 11, wherein the housing is fixed to the valve case member by partly deforming plastically the axial end of the housing so as to cling to an outer circumference of the valve case member.

* * * * *